Oct. 19, 1943.   H. L. SMITH   2,332,177
JUICE EXTRACTOR
Filed Jan. 29, 1941   4 Sheets-Sheet 1

INVENTOR:
HENRY L. SMITH
BY
ATTORNEY

INVENTOR:
HENRY L. SMITH
BY
ATTORNEY

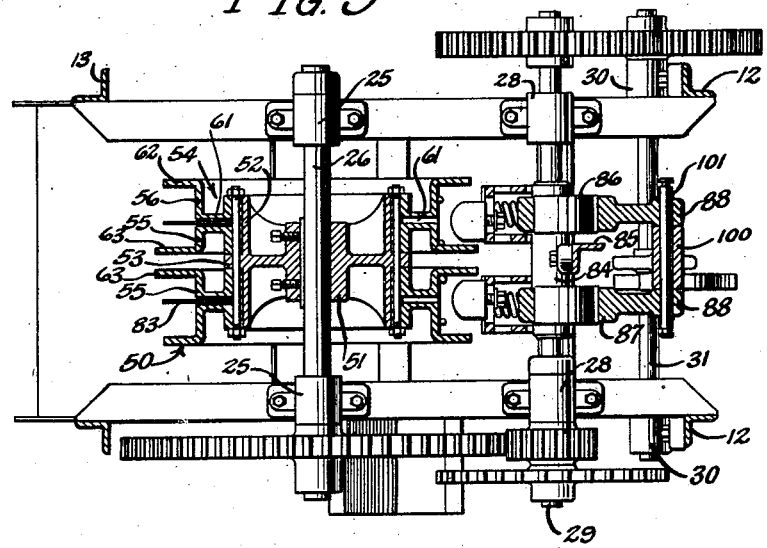
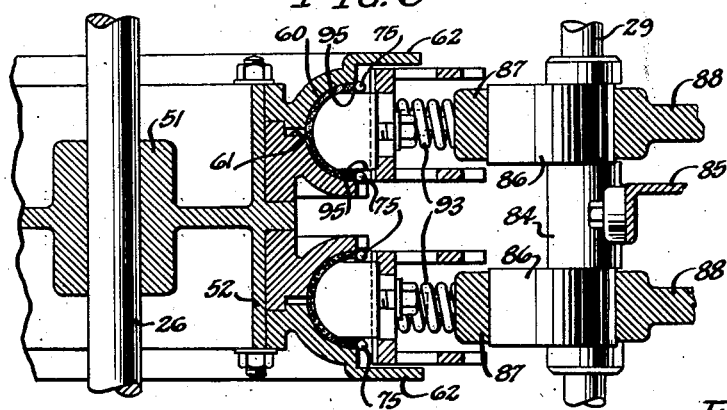
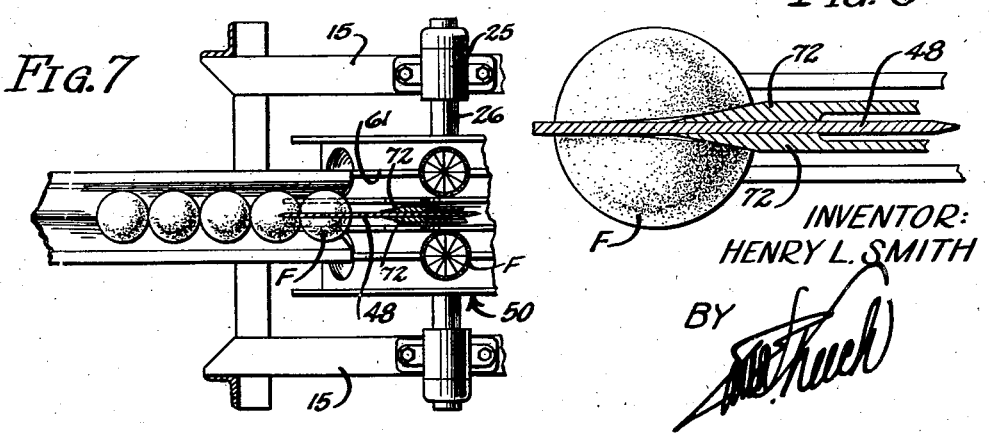

Patented Oct. 19, 1943

2,332,177

UNITED STATES PATENT OFFICE 2,332,177

JUICE EXTRACTOR

Henry L. Smith, Clearwater, Fla., assignor to Food Machinery Corporation, San Jose, Calif., a corporation of Delaware Application January 29, 1941, Serial No. 376,506

6 Claims. (Cl. 100—47)

This invention relates to the art of extracting juice from citrus fruits.

It is an object of the invention to provide a simple and inexpensive machine with relatively large capacity for extracting the juice from citrus fruit.

It is another object to provide such a machine which will extract the juice from the fruit in such a manner as to keep it practically entirely separate from the rind oils of the fruit.

It is yet another object of the invention to provide a simple and inexpensive juice extractor which operates upon a continuously moving stream of fruit.

The manner of accomplishing the foregoing objects as well as further objects and advantages will be made manifest by the following description taken in connection with the accompanying drawings, in which:

Fig. 5 is a horizontal sectional view taken on the line 5—5 of Fig. 3.

Fig. 6 is an enlarged horizontal sectional view taken on the line 6—6 of Fig. 4.

Fig. 7 is a fragmentary horizontal sectional view taken on the line 7—7 of Fig. 3 illustrating the splitting of whole fruit into halves and the delivery of these halves to the pockets in the carrier drum of the machine.

Fig. 8 is an enlarged detail sectional view of a central portion of Fig. 7, particularly illustrating the relationship of the opposite side portions of the fruit section deflector of the invention to the fruit slicing disc thereof.

Figure 1:
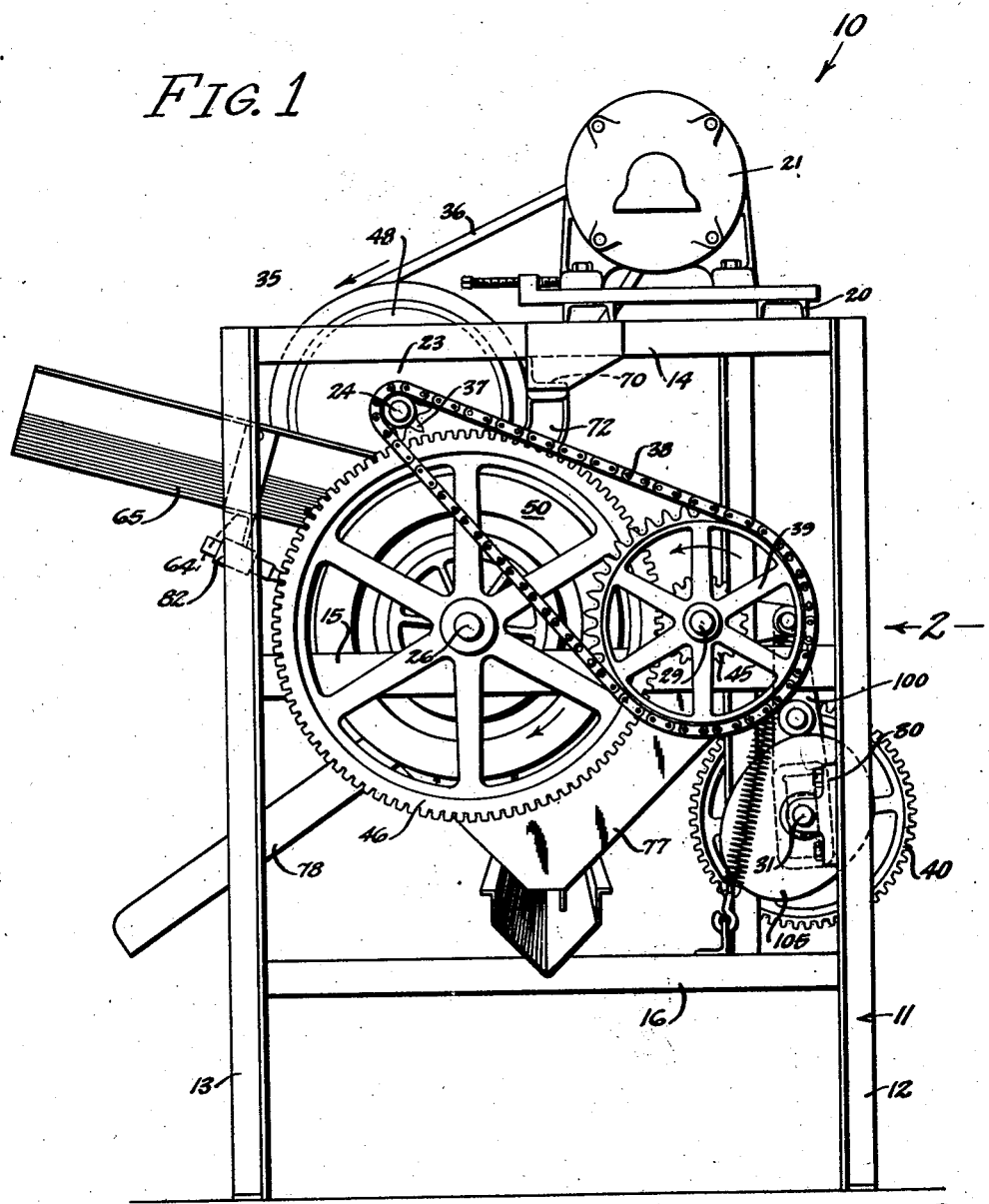
Fig. 1 is a side elevational view of a preferred embodiment of the invention.
Figure 2:
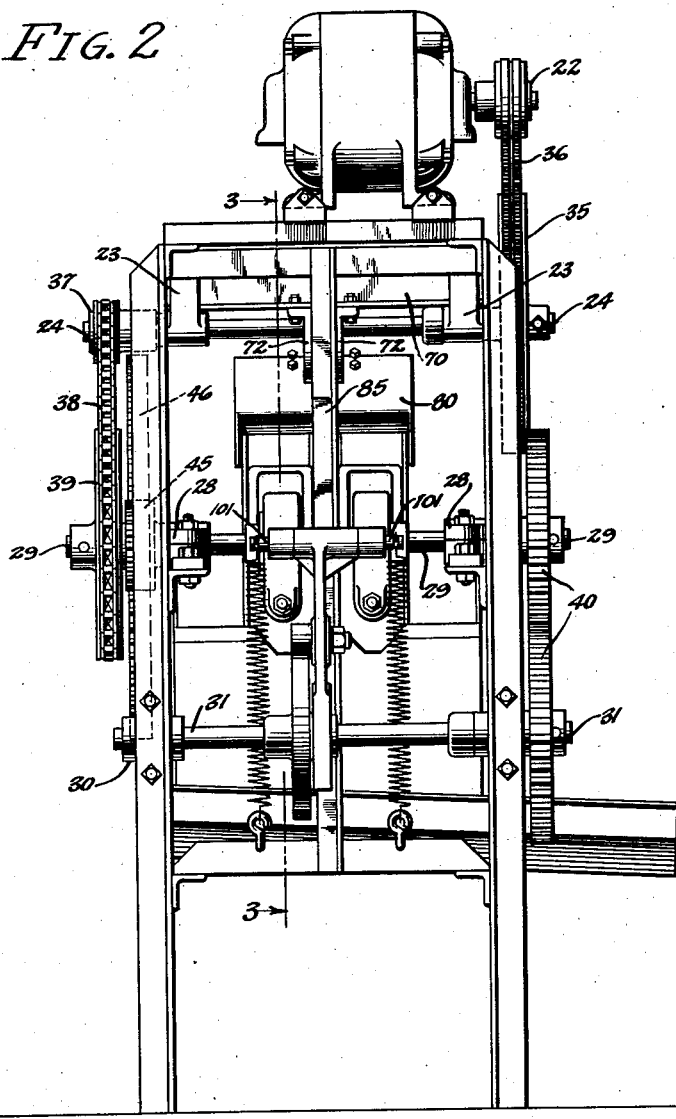
Fig. 2 is an end elevational view of Fig. 1 taken in the direction of the arrow 2.

Referring specifically to the drawings, the juice extractor 10 shown therein includes a frame 11 having vertical legs 12 and 13 which are connected by upper cross bars 14, intermediate cross bars 15, and lower cross bars 16.

Resting on the upper cross bars 14 are channel irons 20, upon which is supported an electric motor 21 having a drive pulley 22. Journalled in bearings 23 provided on the cross bars 14 is a shaft 24. Journalled in bearings 25 provided on cross bars 15 is a shaft 26. Journalled in bearings 28, also provided on these bars, is a shaft 29. Journalled in bearings 30, provided on the legs 12, is a shaft 31.

The shafts 24, 26, 29, and 31 are driven in the following manner: Shaft 24 has a pulley 35 which is driven by belts 36 connecting this with the motor drive pulley 22. Fixed on the other end of the shaft 24 is a sprocket 37, this being connected by a chain 38 with a sprocket 39 on the shaft 29 and by which the latter is driven. The shafts 29 and 31 are provided with meshing gears 40 by which the latter shaft is driven by the former. Provided on the shaft 29 is a pinion gear 45 which meshes with a master gear 46 provided on the shaft 26 so as to drive the latter.

Fixed on the shaft 24 is a rotary fruit slicing disc 48 which is disposed centrally of the machine. Mounted centrally on the shaft 26 is a sliced fruit carrier 50. As shown in Fig. 5, the carrier 50 includes a hub 51 and a rim 52 having a central flange 53, on opposite sides of which are mounted annular fruit holders 54. Each of the fruit holders 54 includes an inner member 55 and an outer member 56 which are secured to the carrier 50 by bolts 57 and co-operate to form a series of hemispherically shaped pockets 60, there being an annular slot 61 which lies in a radial plane and intersects all of the pockets 60 in each of the fruit holders 54. Each of the members 56 has an annular outer guard flange 62. Each of the inner members 55 has a series of hooks 63, these hooks on the two members 55 co-operating to pick up whole fruit in a manner to be made clear hereinafter. The pockets 60 in the two fruit holders 54 are located opposite each other, and a pair of the fruit hooks 63 are disposed just to the rear of each of these pairs of pockets as clearly shown in Fig. 3.

Figure 3:
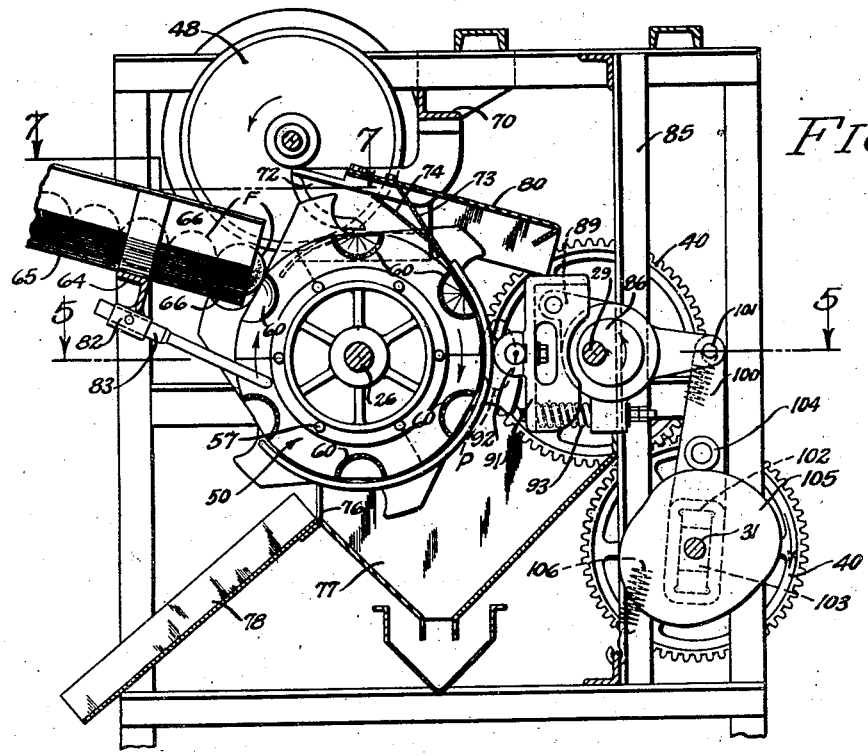
Fig. 3 is a fragmentary sectional view taken on the line 3—3 of Fig. 2 which shows the relationship of the parts of the machine during the operation of the latter when the juice extracting plungers are in full retracted position.

Extending between and rigidly attached to the frame legs 13 is an angle iron 64 supporting a chute 65 which extends inwardly close to the periphery of the carrier 50 and has notches 66 through which the hooks 63 are adapted to pass when the carrier rotates so that each pair of hooks 63 can pick up the foremost piece of a series of pieces of fruit F which are fed to the machine through the chute 65. Extending between and fixed upon the upper frame cross bars 14 is an angle iron 70. Supported from the angle iron 70 is a pair of fruit half deflectors 72. Extending laterally from each of the deflectors 72 is a plate 73 having a fruit half depresser 74 formed thereon and fruit guide rods 75 secured to the lower edge thereof and extending about the periphery of the adjacent fruit holder 54 opposite the mouths of the pockets 60 thereof. The lower ends of the guide rods 75 are held in a fixed position relative to the carrier 50 by supports 76 provided on a juice hopper 77 which is mounted on the frame 11 as shown in Fig. 3. Also supported on the frame adjacent the hopper 77 is a fruit rind chute 78.

Supported on and extending rearwardly from the fruit half guides 72 is a juice hood 80 for catching any juice which might squirt upwardly in the juicing operation and cause this to return downwardly into the hopper 77.

Fixed on the angle irons 64 is a pair of sleeves 82 which adjustably support a pair of fruit shell ejectors 83, the inner ends of which extend rigidly into the annular slots 61.

The shaft 29 is also supported centrally by a bearing 84 provided upon a frame upright 85. Fixed on the shaft 29 and opposite sides of the bearing 84 are eccentrics 86 on each of which is rotatably mounted a plunger rocker 87. Each of these rockers has a rearwardly extending arm 88, a forwardly extending arm 89, and a downwardly extending boss 90. Pivotally mounted on the arm 89 of each of the rockers 87 is a plunger base 91 having a plunger 92 rigidly mounted on the front face thereof and having its lower end yieldably supported, by a spring 93 and a bolt 94, on the boss 90. Each of the plungers 92 preferably has a hemispherical face of a proper size to substantially fit into the interior of the rind of a half of a piece of fruit F in the operation of the machine 10. In order to permit these plungers to extend far enough into the pocket 60 to press the juice from a piece of half fruit the lateral portions of each plunger 92 are flattened off as at 95 to permit this plunger to extend inwardly between the adjacent guide rods 75 without spreading the latter.

As clearly shown in Fig. 6, the guide rods 75 are so related to the pockets 60 as to be disposed over lateral portions of the rind of the half pieces of fruit carried in the pockets 60. With the flattening of the sides of the plungers 92, these are able to be shaped so as to enter the interior cavity of the fruit in which the juice-bearing structure is located so as to press practically all of the juice from the fruit and yet pass freely between the guide rods 75, the manner in which this operation of the plungers is effected being made clear hereinafter.

The arms 88 are pivotally connected to the upper end of a cam follower link 100 by a pin 101. The lower end of this link has a slot 102 which slides vertically on a slide block 103 mounted on the shaft 31. The link 100 has a cam follower roller 104 which is disposed opposite a cam 105 fixed on the shaft 31 and is held in contact therewith by springs 106 connecting the outer ends of the pin 101 to the frame.

Operation

When the motor 21 is energized, the various shafts of the machine 10 are rotated by the drive mechanism previously described so as to rotate these shafts in the directions indicated by arrows in Fig. 3.

The drive ratios are such that the slicing disc 48 is rotated at a relatively high speed and the shafts 29 and 31 at a relatively low speed, and the shaft 26 and the carrier 50 at one-sixth the speed of shafts 29 and 31.

Figure 4:
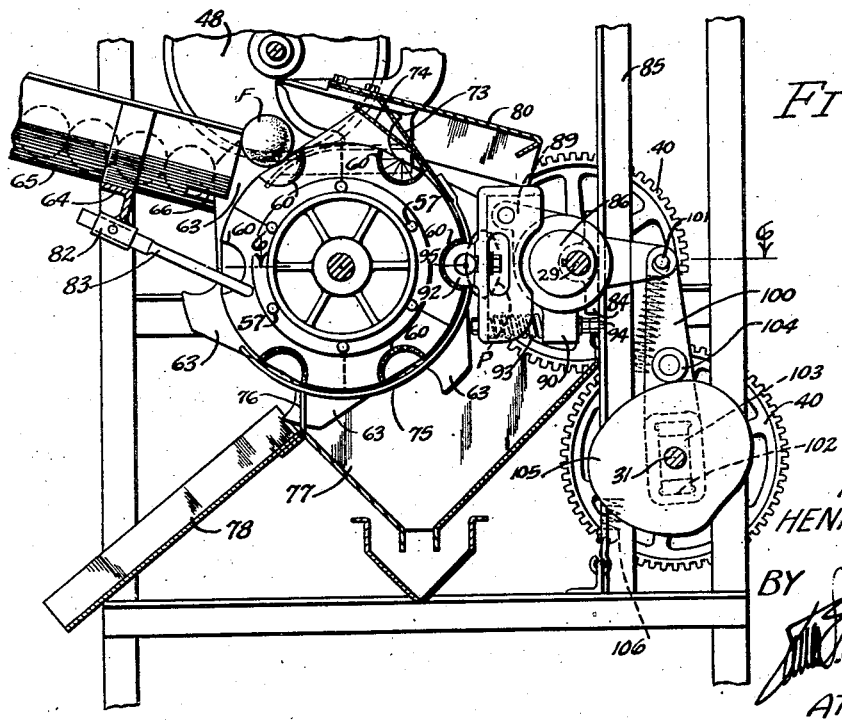
Fig. 4 is a view similar to Fig. 3 showing the juice extracting plungers in their full inward position.

The rotation of the eccentrics 86 with the shaft 29 and the cam 105 with the shaft 31 produces an elliptical motion of the plungers 92 so that these move from a fully retracted position in which they are shown in Fig. 3 to a fully inward position in which they are shown in Fig. 4 and then return to retracted position during each operation cycle. As the shafts 29 and 31 are rotated by the gears 40 at the same rate and in opposite directions the operation of the eccentrics 86 and the cams 105 is synchronous and causes the plungers 92 to be moved rapidly over elliptical paths indicated in Figs. 3 and 4 by the broken lines P. This all takes place while the carrier 50 is continuously rotating and results in the plungers 92 entering and following along with a pair of the pockets 60 to press the juice from the fruit halves disposed therein and then withdraw from these pockets and return upwardly into position for entering the next consecutive pair of pockets 60.

As this machine is primarily designed for use in extracting the juice from oranges, it is in this connection that its operation will be described. A constant supply of oranges F is fed down the chute 65 so that the lowermost orange in the chute is always disposed in the path of a pair of hooks 63 approaching from beneath. This foremost orange is picked up by these hooks as the latter pass through the slots 66 in the chute and carried in contact with the slicing disc 48 which slices the orange into two halves, these halves being shifted outwardly by the deflectors 72 so that these half oranges fall into the pockets 60 adjacent this pair of hooks 63, as clearly shown at the top of the carrier in Fig. 3. Should these half oranges not fall directly into these pockets 60, they are forced thereinto by the yieldable depressers 74. The half oranges thus delivered to the pockets 60 are retained therein by the guide plates 73 and the guide rods 75, the latter extending opposite the zone in which the plungers 92 are caused to enter the pockets 60 for expressing the juice from the half oranges contained therein.

It is a particular advantage of my invention that the guide rods 75 may be fixed and yet effectively retain the orange halves in the pockets 60 while the juicing operation takes place. This is accomplished by making the plungers 92 substantially hemispherical in shape and causing these to be stationary, whereas in many juice extractors they are rotated about a central axis. I then flatten these hemispherical plungers on their opposite faces as at 95 so that they will extend freely between the guide rods 75 permitting these rods to remain in place and hold the orange halves in the pockets 60 throughout the juice extracting operation.

The springs 93 are provided in case there is an obstruction in any of the pockets 60 preventing the insertion of one or the other of the plungers 92 into this pocket. In such a case, the spring 93 yields, preventing any damage to the machine. The juice extracted by insertion of the plungers 92 into the orange halves drains downwardly into the hopper 77 and from this into any receptacle placed there to receive the same. The half orange rinds remaining in the pockets 60 after the juice has thus been extracted therefrom travel around with the carrier 50 past the lower ends of the guide rods 75 and are ejected from the pockets by the ejector rods 84 and disposed downwardly into the chute 78 from which they gravitate into a receptacle provided for receiving the same.

It is to be especially noted that the juice extractor of my invention accommodates a continuous stream of fruit and thus possesses a relatively high capacity. Owing to the peculiar elliptical motion of the plungers 92 produced by the eccentric and cam mechanism of the invention, the carrier 50 is permitted to rotate continuously. This feature also greatly increases the capacity of the machine over the type of machine where the carrier must travel intermittently.

Another important feature of the invention lies in the construction of the fruit holders 54 so that these may be quickly changed in order to extract juice from fruit of a different size. This is accomplished by making the inner members 55 as well as the outer members 56 in halves, each of which extends half way around the rim 52 of the carrier 50. The dividing lines between these halves are clearly shown in Figs. 3 and 4. In assembling each fruit holder 54, the dividing plane of the inner member 55 is placed on a different diameter than the dividing plane of the outer member 56. Thus, the halves of the inner and outer members have an overlapping relation. When replacing one set of fruit holders 54 with another set having different size pockets 60, the bolts 57 are removed in the upwardly disposed portion of the carrier 50 to permit the respective halves of the inner and outer members 55 and 56 to be removed one at a time and replaced by a corresponding part of the new fruit holders 54.

As shown in Figs. 7 and 8, the deflector 72 fits closely the opposite faces of the fruit slicing disc 48 so as to practically scrape the two halves of each sliced orange laterally away from the slicing disc immediately following the severing of the orange. This greatly reduces the distance which it is necessary for the orange halves to travel following their separation so that they immediately drop laterally into the pockets 60 of the carrier disposed opposite the hooks 63 which have propelled the orange against the slicing disc.

What I claim is:

1. In a juice extractor, the combination of: a rotary carrier having pockets about the periphery thereof for receiving cut pieces of fruit; means for rotating said carrier; means for supplying said pockets with said pieces of fruit while said carrier is being rotated; means for retaining said pieces of fruit in said pockets during said rotation; a plunger of a size and shape to permit the same to be pressed into the juice-bearing structure of said pieces of fruit to force the juice therefrom; a rotary eccentric for supporting said plunger; means for rotating said eccentric to cause said plunger to revolve about the axis of rotation of said eccentric; and means for modifying the response of said plunger to said eccentric to cause said plunger to extend into said pieces of fruit as aforesaid while said carrier is rotating and then withdraw from said pieces of fruit.

2. In a juice extractor, the combination of: a rotary carrier having pockets about the periphery thereof for receiving cut pieces of fruit; means for rotating said carrier; means for supplying said pockets with said pieces of fruit while said carrier is being rotated; means for retaining said pieces of fruit in said pockets during said rotation; a plunger of a size and shape to permit the same to be pressed into the juice-bearing structure of said pieces of fruit to force the juice therefrom; a rotary eccentric for supporting said plunger; means for rotating said eccentric to cause said plunger to revolve about the axis of rotation of said eccentric; and cam means for modifying the response of said plunger to said eccentric to cause said plunger to extend into said pieces of fruit as aforesaid while said carrier is rotating and then withdraw from said pieces of fruit.

3. A combination as in claim 1, in which said plunger is mounted on a ring bearing surrounding said eccentric; and an arm on said ring bearing; said plunger response modifying means operating in synchronous relation with said eccentric and connecting to said arm.

4. A combination as in claim 1, in which said plunger is mounted on a bearing ring encircling said eccentric; yieldable means disposed between said bearing ring and said plunger; and an arm on said ring, said arm connecting with said plunger response modifying means.

5. In a juice extractor, the combination of: a rotary carrier having a series of pockets about the periphery thereof for receiving cut pieces of fruit; means for rotating said carrier; a plunger of a size and shape to permit the same to be pressed successively into the juice-bearing structure of said pieces of fruit to force the juice therefrom; and means operating in timed relation with said rotary carrier to move said plunger repeatedly over a path forming a closed figure, said path being disposed so that during each cycle of following the same, said plunger extends into one of said pockets to press the juice from the piece of fruit disposed therein and withdraws therefrom, so that in the next succeeding cycle said plunger extends into the next succeeding pocket on said carrier to press the juice from the piece of fruit therein.

6. In a juice extractor, the combination of: a rotary carrier having a series of pockets about the periphery thereof for receiving cut pieces of fruit; means for rotating said carrier; a plunger of a size and shape to permit the same to be pressed successively into the juice-bearing structure of said pieces of fruit to force the juice therefrom; and means operating in timed relation with said rotary carrier to move said plunger over a path forming a closed elliptical figure, said path being disposed so that during each cycle of following the same, said plunger extends into one of said pockets to press the juice from the piece of fruit disposed therein and withdraws therefrom, so that in the next succeeding cycle said plunger extends into the next succeeding pocket on said carrier to press the juice from the piece of fruit therein.

HENRY L. SMITH.